May 20, 1924.
G. BAILHE
1,495,061
ACCELERATOR FOR MOTOR VEHICLES
Filed May 31, 1922
2 Sheets-Sheet 1
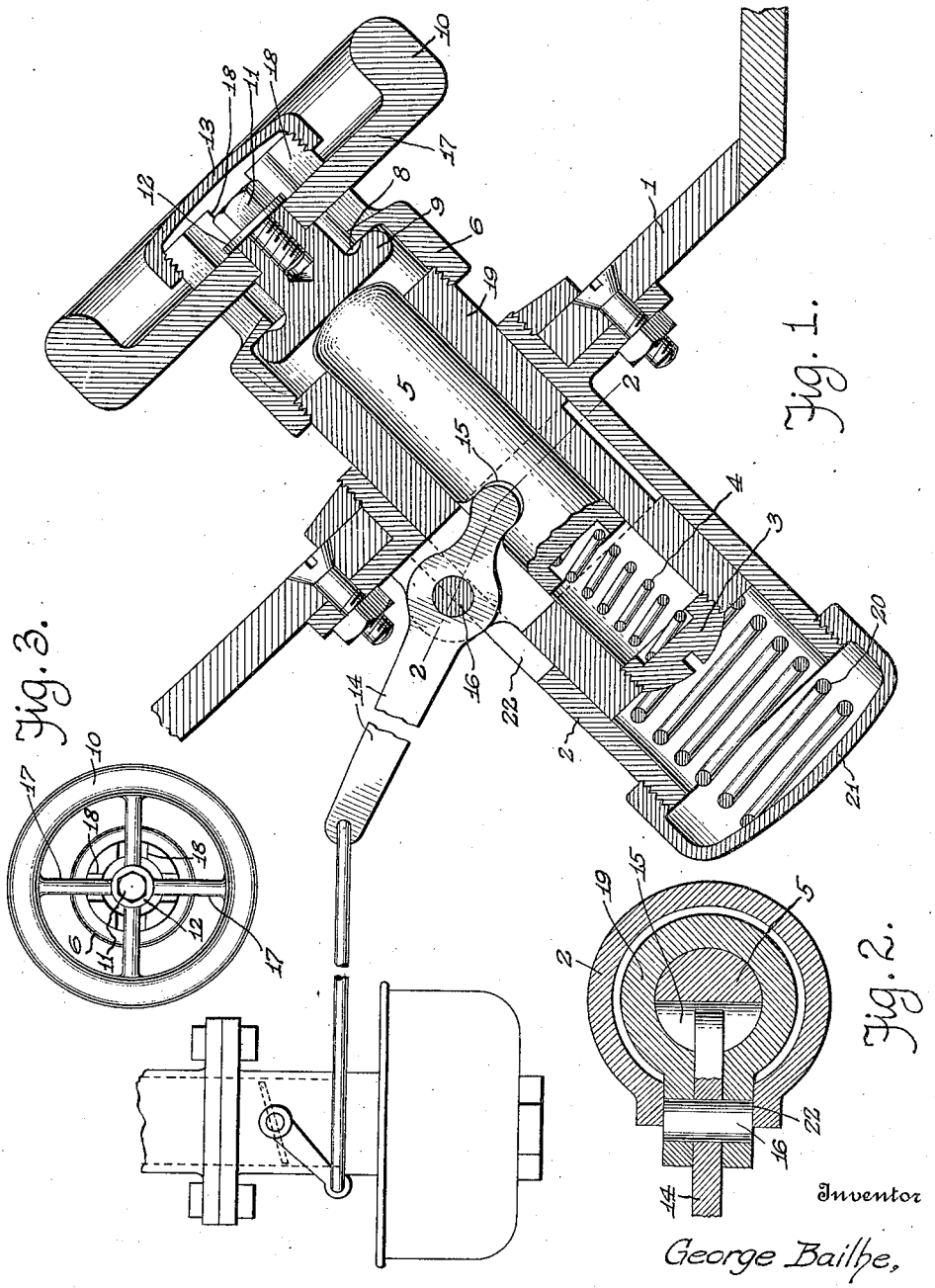

May 20, 1924.

G. BAILHE

ACCELERATOR FOR MOTOR VEHICLES

Filed May 31 1922

Inventor
George Bailhe,
By Homer C Underwood
Attorney

Patented May 20, 1924.

1,495,061

UNITED STATES PATENT OFFICE.

GEORGE BAILHE, OF FORT WAYNE, INDIANA.

ACCELERATOR FOR MOTOR VEHICLES.

Application filed May 31, 1922. Serial No. 564,876.

*To all whom it may concern:*

Be it known that I, GEORGE BAILHE, a citizen of the United States of America, residing in the city of Fort Wayne, county of Allen, and State of Indiana, have invented certain new and useful Improvements in Accelerators for Motor Vehicles, of which the following is a specification.

My invention relates to accelerators for motor vehicles and has for its object to provide an accelerator which the driver of a motor vehicle may operate by tilting his foot in any direction from the foot rest and without removing his foot from such rest. I also provide means whereby in the event of the driver becoming excited in an emergency and pressing violently upon the accelerator thinking he is applying the brakes, the fuel supply to the engine will be cut off. Many accidents have resulted from such erroneous use of accelerators of types now in use where no provision has been made to guard against disastrous consequences which are likely to flow from increasing the speed of the car when the driver should stop it. It is a matter of common knowledge that with most if not all accelerators now in use it is necessary for the driver to continually shift his foot on and off the accelerator, tending to unduly fatigue the driver. In the use of my invention this shifting of the foot is unnecessary.

With the foregoing and other objects in view I will now describe the mechanism by which these objects are attained, referring to the drawings forming a part of my specifications and using reference numerals to indicate the several parts.

Fig. 1 is a vertical section showing my accelerator secured to the floor-board of a motor vehicle, with a diagrammatic view of the fuel supply regulator.

Fig. 2 is a section through line 2—2 of Fig. 1.

Fig. 3 is a plan view of the accelerator pedal.

Figure 4:
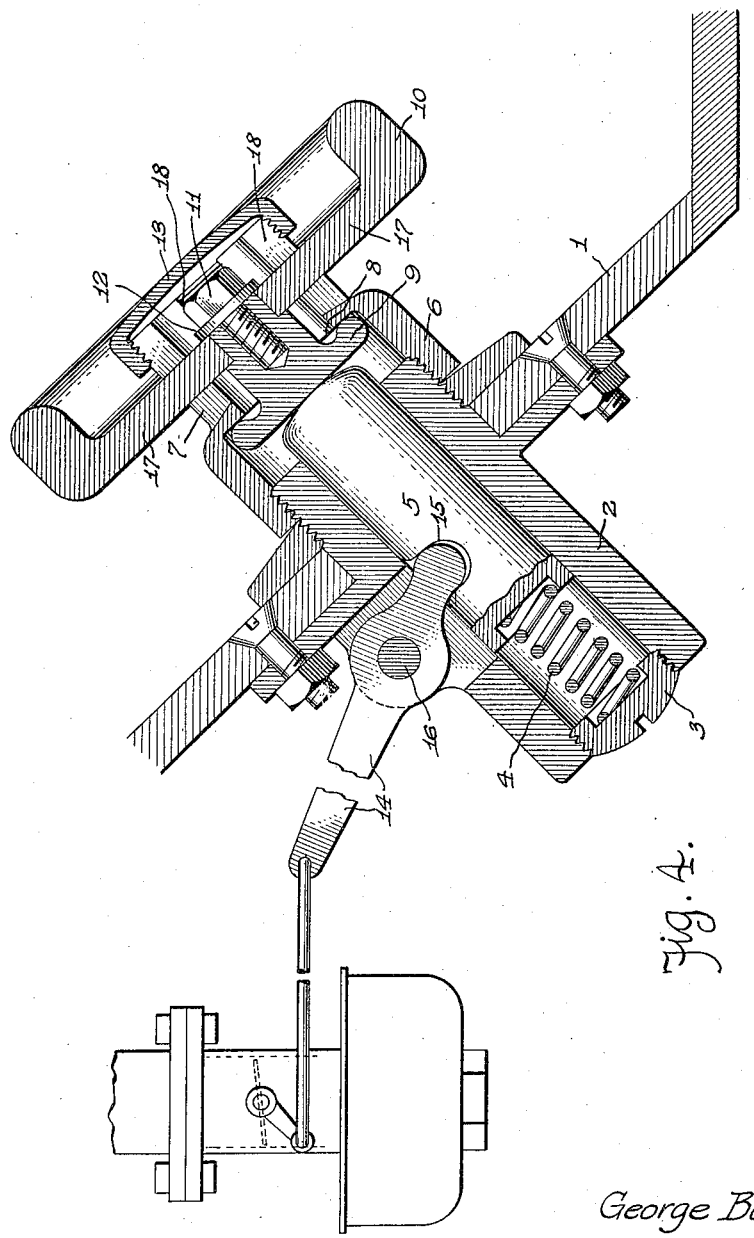
Fig. 4 is a section showing the construction of my accelerator when used without means for closing the fuel supply or regulator, by pressure upon the accelerator mechanism.

In the accompanying drawings 1 indicates the floor-board of a motor vehicle to which is secured in any suitable manner a casing 2. The bottom of the casing 2 is closed by a plug 3 threaded therein. A spring 4 rests upon the plug 3 and resting on the spring 4 is a plunger 5 which is adapted to be operated against the spring 4 and slide up and down within the casing 2. Threaded to this casing is a sleeve 6 having a restricted portion 7 forming a shoulder 8 on the interior of the sleeve. The plunger is rounded at its upper end and resting upon this plunger is a knob 9 which forms a part of the accelerator pedal 10 and is secured thereto by a bolt 11 and washer 12. When pressure is applied at any point of the periphery of the pedal 10, the knob 9 presses against the shoulder of the sleeve and against the rounded end of the plunger and the plunger is thereby depressed and is brought back to its normal position by the action of the spring 4 when the pressure is released. The sleeve 6 is provided with a cap 13 which forms a rest for the foot of the driver and by tilting his foot in any direction from this foot rest he may apply pressure to the accelerator pedal and thereby actuate the plunger without removing his foot from the rest.

A lever 14 is connected at one end to a fuel supply regulator which is of a type in common use and need not be specifically described, and the other end of the lever extends into a transverse slot 15 in the plunger 5 and this lever oscillates on a pivot 16 which is supported by the casing.

The pedal 10 is provided with spokes 17 which operate in slots 18 cut or moulded in the top of the sleeve 6.

In Fig. 1, the plunger is mounted in a cylinder 19 which may be reciprocated in the casing 2 and this cylinder is supported by a spring 20 which in turn is supported upon a cap 21 threaded to the casing 2. The sleeve 6 is threaded to the cylinder. A part of the casing is cut away at 22 so the lever 14 and its attachment will not prevent the cylinder being depressed. In this instance, however, the lever 14 is not pivoted to the casing but to an extension of the cylinder wall. It will be seen from this construction that pressure applied to the foot-rest 13 with sufficient force to overcome the resistance of the spring 20 will carry downward the arm 14 through the space 22 and close the fuel supply valve; also that pressure of like character applied to the foot pedal will close the fuel supply valve, but in normal operation of the accelerator the foot rests upon the cap 13 and the spring 20 is of sufficient strength to prevent any substantial displacement of the cylinder 19 by any ordinary pressure of the foot in normal driving of the car.

The operation of my device will be readily understood. The driver rests his foot upon the cap 13. When he desires to accelerate the speed of his vehicle he tilts his foot against the periphery of the pedal 10 at any convenient point and pressure thus applied rocks the knob of the pedal on the end of the plunger, depressing the plunger and oscillating the arm 14 on its pivot, thereby opening the throttle valve. When the pressure is released the spring which supports the plunger causes the plunger to return to its normal position and the arm 14 is driven in the opposite direction.

Having fully described my invention and its operation, what I claim is:

1. An accelerator for motor vehicles comprising a plunger, a fuel supply regulator, an oscillatable lever in contact with a plunger and connected to the fuel supply regulator, a foot-pedal in contact with the plunger and adapted to rock thereon to depress the plunger and actuate the fuel supply regulator.

2. An accelerator for motor vehicles comprising a plunger mounted upon a resilient support, a fuel supply regulator, an oscillatable lever in contact with the plunger and connected to the fuel supply regulator, a foot-pedal in contact with the plunger and adapted to be rocked thereon to depress the plunger.

3. An accelerator for motor vehicles comprising a plunger, a fuel supply regulator, a lever in contact with the plunger and connected to the fuel supply regulator, a foot-pedal in contact with the plunger and adapted to be rocked thereon to actuate the plunger.

4. In an accelerator for motor vehicles, a plunger, a foot-pedal centrally mounted over the plunger, a member secured to the foot-pedal and adapted to contact with the plunger and actuate the plunger whenever the foot-pedal is tilted from its normal position.

5. An accelerator for motor vehicles comprising a foot-rest, a foot-pedal encircling the foot-rest, a plunger in contact with the foot-pedal, a fuel supply regulator, a lever in contact with the plunger and connected with the fuel supply regulator and means for reciprocating the plunger and actuating the lever.

6. An accelerator for motor vehicles comprising a foot-rest mounted on a cylinder having a resilient support, a foot-pedal encircling the foot-rest, a plunger in contact with the foot-pedal, a fuel supply regulator, a lever secured to the cylinder so that one end is in contact with the plunger and the other end connected to the fuel supply regulator.

7. In an accelerator for motor vehicles, a plunger, a foot-pedal centrally mounted over the plunger and adapted to rock in a plurality of planes, a member secured to the foot-pedal and adapted to contact with and actuate the plunger whenever the foot-pedal is rocked.

Signed at Fort Wayne, county of Allen, State of Indiana, this 17th day of May, 1922, in the presence of two subscribing witnesses.

GEORGE BAILHE.

Witnesses:
LUCILE C. BARAL,
NELL KARTOKREUN.